United States Patent [19]

Wang et al.

[11] Patent Number: 5,691,773
[45] Date of Patent: Nov. 25, 1997

[54] ANTI-HAND-JITTERING DATAFORM READERS AND METHODS

[75] Inventors: Ynjiun P. Wang; Angi Ye, both of Fort Myers, Fla.

[73] Assignee: Metanetics Corporation, Fort Myers, Fla.

[21] Appl. No.: 526,868

[22] Filed: Sep. 12, 1995

[51] Int. Cl.$^6$ ........................................ H04N 9/64
[52] U.S. Cl. .................. 348/249; 348/699; 235/472; 235/494
[58] Field of Search ................ 358/213; 348/699, 348/249; 235/472, 494

[56] References Cited

U.S. PATENT DOCUMENTS

| | | | |
|---|---|---|---|
| 4,567,524 | 1/1986 | Levine | 358/213 |
| 5,324,923 | 6/1994 | Cymbalski | 235/454 |
| 5,343,031 | 8/1994 | Yoshida | 235/454 |
| 5,389,918 | 2/1995 | Kusaka | 348/699 |
| 5,444,231 | 8/1995 | Shell Hammer | 235/472 |
| 5,506,392 | 4/1996 | Barkan et al. | 235/472 |

*Primary Examiner*—Harold Pitts
*Attorney, Agent, or Firm*—Kenneth P. Robinson

[57] ABSTRACT

Dataform readers using two-dimensional sensor array cameras provide image frames comprising successive first and second fields of image data. In hand-held operation, hand jitter results in image offset causing registration errors between fields. Resolution and decoding performance are enhanced by described readers and methods. Decoding is implemented first by use of image data of a first field and the results of such decoding are supplemented by results of decoding of remaining portions of the dataform by use of second field image data. Decoding may also be carried out by first determining the magnitude of a disparity vector extending in the direction of image offset. The disparity vector is then used to provide enhanced decoding by use of first field image data and registration-corrected second field image data.

22 Claims, 5 Drawing Sheets

ANTI-HAND-JITTERING DATAFORM READERS AND METHODS

This invention relates to readers for dataforms, such as bar codes, and more particularly to dataform readers operating with enhanced resolution by overcoming image offset causing registration errors between sequential fields of image data.

BACKGROUND OF THE INVENTION

Dataforms, such as two-dimensional bar codes, are being used in a variety of applications. Hand-held and other readers for use with dataforms, defined as machine readable representations of data, are typically responsive to illumination reflected from a dataform image. Thus, illumination incident on dark and light bar cells of a bar code is reflected with differing reflectivity values from the dark and light portions.

Various types of two-dimensional (2D) dataforms are suitable for the encoding of large and increasing quantities of data. The reading of such dataforms, to enable recovery of the encoded data, requires high levels of accuracy in sensing and valuing parameters such as cell sizes, dimensions, edge positions, and cell orientation, as represented by variations in the level of illumination reflected from a dataform. Cost and reliability, as well as size, weight, power consumption and other factors, are also considerations in design and production of dataform readers, particularly for hand-held use.

Forms of 2D CCD devices or camera configurations designed for video applications provide a number of features attractive for dataform reader applications. Typically, CCD camera configurations designed for video applications operate to television or other interlaced video signal standards whereby image values for a single image, or frame, are provided in the format of two successive fields of image values. Thus, for a single image, the first field usually represents the readout of image values for every second line of sensors of the CCD array and the second field represents the readout from the remaining rows of sensors.

For video, movement is expected and the eye accommodates displacement of image portions from field to field and frame to frame. However, small dimensions at the limits of resolution capabilities can be critical for dataform reading and decoding. Any errors introduced by a lack of registration between image portions may therefore introduce unacceptable errors or inhibit successful decoding.

At present, video-type CCD camera configurations have been applied for use in bar code readers. However, in such applications operation has typically relied upon storage in memory of image data representative of only a single field. With an interlaced configuration, the first and second fields of image values for a single frame or image are produced by exposure of the associated rows of CCD sensors for the second field with up to about 0.02 seconds delay after the first field. In a hand-held dataform reader, such inter-field delay can result in a significant loss of registration between the two fields of a frame. Thus, hand jitter between fields can result in image displacement or offset of magnitudes which are material enough in dataform reading to degrade or preclude successful decoding. That is to say that with such jitter, combining two successive fields to provide a full resolution frame of image data for a given image can result in a blurred undecodable image in dataform applications. To avoid such deleterious effects of image offset representing loss of registration between fields, prior use of CCD camera configurations in dataform readers has typically relied on use of only a single field as representative of a given dataform image. The result is operation with only one-half of the vertical resolution which the CCD camera is inherently capable of providing. Operation with half resolution obviously restricts operation to decoding of dataforms with less complexity and detail than could be decoded with full or frame-level resolution.

Objects of the present invention are, therefore, to provide new and improved dataform readers and methods capable of achieving enhanced or frame-level resolution while operating with image data subject to registration errors between fields as a result of image offset.

Other objects of the invention are to provide dataform readers and methods having improved capabilities of operation utilizing image data of successive non-registered fields (e.g., the first and second fields of a frame) through use of second field image data to supplement first field decoding by one or more of:

(A) use of second field image data to decode portions of a dataform not satisfactorily decoded by use of the first field image data;

(B) decoding of both first and second fields of image data and using decoded portions of second field image data to supplement dataform portions not satisfactorily decoded by use of the first field image data;

(C) use of first and second field image data to determine the magnitude or direction, or both, of one or more disparity vectors representative of an image offset between data of the two fields, the disparity vector values being usable to correct offset errors during decoding of a dataform; and (D) use of disparity vector values to enable combined use of image data of first and second fields, or actual combination of such image data into a registered frame of image data, for decoding a dataform.

SUMMARY OF THE INVENTION

In accordance with the invention, a dataform reader, configured to reduce effects of image offset causing registration error between sequential fields of image data, includes a sensor array. The sensor array is responsive to illumination reflected from a dataform to provide signals representative of illumination levels on first and second groups of sensors respectively representing first and second field images subject to image offset. A first memory capacity is coupled to the sensor array to store first field image data representative of illumination levels on the first group of sensors. A second memory capacity is coupled to the sensor array to store second field image data representative of illumination levels on the second group of sensors. The dataform reader includes a processor arranged to access the first memory capacity to utilize first field image data to decode a portion of the dataform and to access the second memory capacity to utilize second field image data to supplement decoding of the dataform.

Also in accordance with the invention, a first method of decoding a dataform, using image data for sequential fields subject to image offset causing registration error, includes the following steps:

(a) providing first and second fields of image data representative of illumination levels reflected from elements of a dataform and subject to image offset;

(b) utilizing first field image data to decode a portion of the dataform;

(c) utilizing second field image data to decode a remaining portion of the dataform;

(d) combining the results of steps (b) and (c);

(e) repeating steps (a) through (e), if the combined results in step (d) are inadequate to provide a desired level of decoding of the dataform; and (f) providing decoded dataform data for further use, if the combined results in step (d) are adequate to provide a desired level of decoding of the dataform.

In use of the invention, a second method of decoding a dataform, using image data for sequential fields subject to image offset causing registration error, includes the following steps:

(a) providing first and second fields of image data representative of illumination levels reflected from elements of a dataform and subject to image offset;

(b) determining, by use of such image data, the magnitude of a least one disparity vector extending in a direction representative of the image offset; and (c) decoding the dataform by use of image data of both the first and second fields, with use of the disparity vector magnitude to enable improved registration of image data of one field relative to image data of the other of the first and second fields.

For a better understanding of the invention, together with other and further objects, reference is made to the accompanying drawings and the scope of the invention will be pointed out in the accompanying claims.

DESCRIPTION OF THE INVENTION

Figure 1:
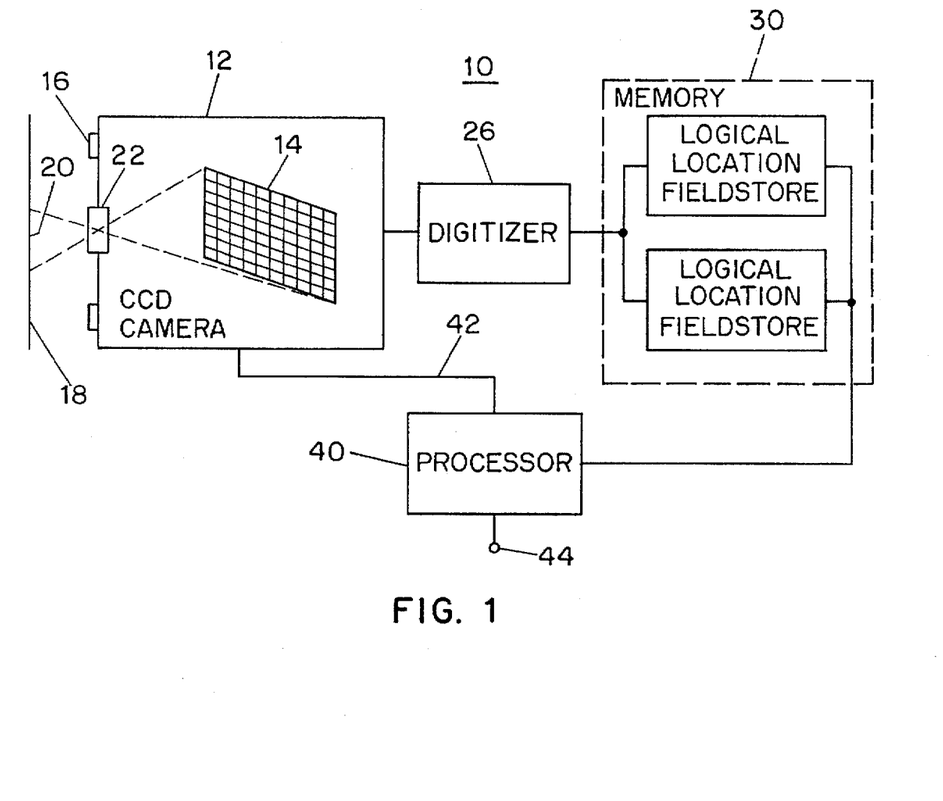
FIG. 1 is a simplified block diagram of a dataform reader utilizing the invention.

A dataform reader in accordance with the invention is illustrated in simplified form in FIG. 1. Construction and operation of various types of dataform readers are now well known to persons skilled in the art. More particularly, construction and use of dataform readers including image recording or camera devices using two-dimensional arrays of CCD sensors, to provide image signals in a video type, two-field interlaced format, are known. As noted above, application of such a video type camera device to a bar code reader typically leads to a compromise in overall image quality or resolution resulting from either use of only single field images or use of mis-registered fields of image data.

In accordance with the invention, the FIG. 1 dataform reader is configured to reduce effects of image offset causing registration error between sequential fields of image data. As shown, the FIG. 1 dataform reader 10 includes a CCD camera device 12 including a sensor array 14, represented symbolically. Sensor array 14 may typically comprise a two-dimensional array of photosensitive devices suitable to provide a selected resolution less, greater or substantially equal to typical video resolution. Camera 12 may also include LED or other devices 16 arranged to illuminate a target area 18 including a printed or other image of a dataform at a position 20. The dataform reader 10 may further include a lens or other optical arrangement 22 suitable for focusing illumination reflected from the dataform to cause an image of the dataform to fall on the CCD sensor array 14. The sensor array 14 is thus responsive to illumination reflected from a dataform to provide signals from the array of sensors which are representative of illumination levels on the sensors. When operating in a video type interlaced format, image signals for a first field are provided by reading out image signals from a first group of sensors. Such first group typically comprises the sensors of every second line of sensors. Signals for the second field are then provided by reading out image signals from a second group of sensors, typically comprising the alternate rows of sensors not read for the first field.

The specific camera and signal processing elements can be selected and arranged by skilled persons in a variety of formats. In typical operation, the first and second fields are produced by exposure of the first and second groups of sensors at successive times, resulting in a time delay of up to about 0.02 seconds for the second field. The result is to provide signals representative of illumination levels on the first and second groups of sensors which respectively represent first and second field images subject to image offset causing registration error. The image offset commonly arises in use of a hand-held dataform reader. In hand-held operation, the reader is not held perfectly steady and a magnitude of image offset which is significant in dataform decoding can arise as a result of hand movement or jitter during such a period of 0.03 seconds between exposure of the two fields. Such image offset represents mis-registration between images of the first and second fields.

As shown, the FIG. 1 dataform reader includes a digitizer 26 suitable for converting analog image signals, typically read out as voltage levels representative of illumination levels on individual sensors of the array 14, into digital gray scale values in a form suitable for memory storage.

The dataform reader, as illustrated, also includes a memory 30 having a first memory capacity 32 to store first field image data and a second memory capacity 34 to store second field image data. Memory 30, and portions 32 and 34, are coupled to the sensor array via digitizer 26. In FIG. 1, the first memory capacity 32 is represented as a first field store memory and the second memory capacity as a second field store memory, each providing logical location of image data correlated to sensor array pixel position. In other applications, memory capacities may be provided as first and second sections of a larger common or frame store memory 30, as selected address locations of a common memory, etc. Also, the address locations may be interlaced to provide memory locations corresponding to pixel location within the frame.

The FIG. 1 dataform reader further includes processor 40, which may be an appropriate type of microprocessor operating with suitable software programs. Processor 40 may provide a variety of functions as common in dataform reader applications, including control of various parameters in operation of CCD camera 12 via connection 42, as well as decoding of dataforms and other functions. Decoded dataform data made available at output port 44 can be coupled by wire or transmitter for further processing. In accordance with one aspect of the present invention, processor 40 is arranged to access the first memory capacity to utilize the first field image data to decode a portion of the dataform and to access the second memory capacity to utilize the second field image data to supplement decoding of the dataform.

With this approach, an attempt can be made to decode the entire dataform using only the first field image data. If that is successful, the decoding cycle is complete. However, if one or more portions of the bar code remain undecoded, use can be made of the second field image data for supplemental decoding. Other approaches for use of the second field image data in a supplementary manner include the following. Processor 40 may be arranged to attempt to decode the entire dataform by independent use of the image data of each of the first and second fields. Decoded results from use of the second field image data can then be used to supplement incomplete decoded results achieved from use of the first field image data. In a different supplemental approach, image data of the first and second fields (samples for corresponding image areas, for example) is used to determine direction and magnitude values of a disparity vector representative of the extent of an image offset between the image data of the two fields. The disparity vector values may then be used to correct offset errors during use of the first and second field image data to decode the dataform. For example, the disparity vector values can be used to correct image offset effects to enable the image data from the two fields to be combined into a higher resolution frame of image data, which is then used for dataform decoding. Derivation of disparity vector values will be considered further in the following description.

Figure 2A:
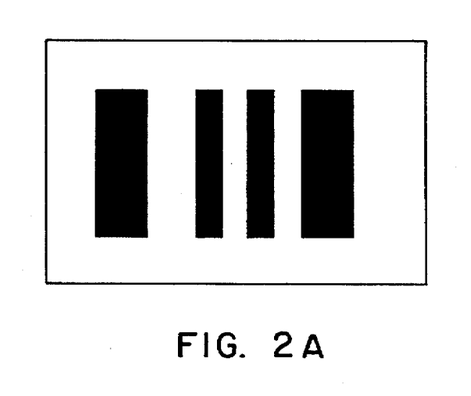
FIG. 2A is a representation of a portion of a dataform.
Figure 2B:
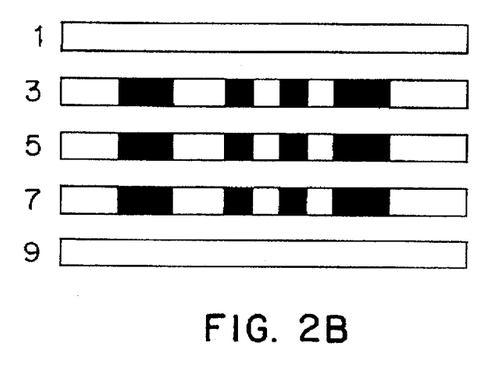
FIGS. 2B and 2C are representations of first and second fields of image data based on illumination reflected from the FIG. 2A dataform portion, with the FIG. 2C field of image data offset to the right as a result of jitter of a hand-held dataform reader during image capture.
Figure 2C:
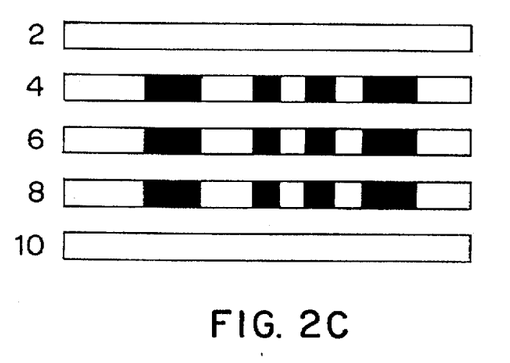
Figure 2D:
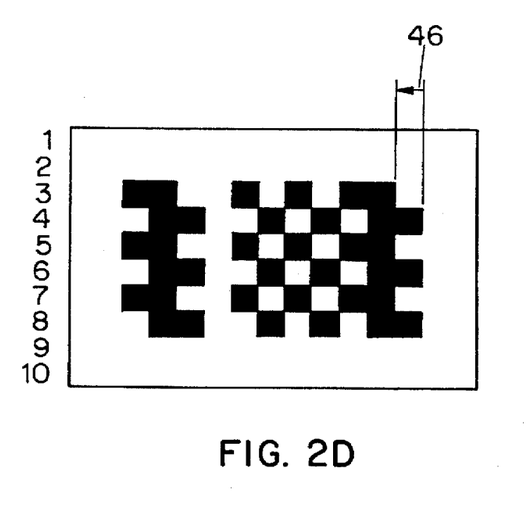
FIG. 2D represents a combination of the first and second fields, showing mis-registration resulting from the image offset.

Referring now to FIGS. 2A–2D, certain effects of field-to-field image offset on registration accuracy in a frame of dataform image data are considered in further detail. FIG. 2A represents an accurate image of a portion of a bar code dataform. Since the invention is particularly relevant in the context of resolution limitations in decoding highly complex dataforms, such as 2D bar codes including hundreds or thousands of individual bar elements, FIG. 2A can be considered to represent a small portion of a complex image. FIG. 2B shows the FIG. 2A bar code as represented by the odd-numbered rows of a sensor array (e.g., the first field image data). FIG. 2C correspondingly shows the bar code as represented by the even-numbered rows of sensor elements (e.g., the second field image data) in the presence of hand jitter shifting the position of the bar code reader between exposure of the first and second fields. FIG. 2D shows the FIG. 1A bar code as represented by the combination of the image data of the FIG. 2B first field with the jittered image data of the FIG. 2C second field. As shown, the combined image of FIG. 2D is not registered, so that image resolution is lost and the capability of distinguishing small image dimensions is compromised.

As will be appreciated in comparing FIG. 2B to FIG. 2A, a single field in this context represents a fifty percent loss of vertical resolution (which would not be important for this simple example of four vertically extending bars). Horizontally, in this example there is no loss of resolution, since there are the same number of pixels (sensor element positions) in each row of FIGS. 2A and 2C, as there would be in each row of a complete frame. For smaller, more complex, patterns and obliquely aligned patterns this loss of vertical resolution can be much more significant to dataform decoding capability.

In this particular example, in FIG. 2C hand jitter has produced an image offset exactly corresponding to the narrowest element width, creating in part a neat checkerboard pattern which is not typical. Image offset can be of any magnitude up to a nominal maximum offset resulting from the maximum hand movement which can be expected during actual use of a dataform reader. As a practical matter, offset between successive first and second fields may result from relatively minor lateral (as illustrated) or angular hand positioning movements between exposure of first and second groups of sensors. The resulting offset can be horizontal, vertical or at some oblique angle. With digital data for the first and second fields available in memory and knowledge that the image data represents discrete dark and light dataform elements, portions of the stored image data can be analyzed to calculate the direction and magnitude of a disparity vector representative of the image offset between the fields. A correction can thereby be provided, by use of disparity vector values, to enable the first and second fields of image data to be processed on an aligned basis so that the images represented by the first and second fields are effectively registered (even though they are not registered based on actual pixel locations in the sensor array). Alternatively, as discussed above, image data of the first field can be used to decode portions of a dataform and such decoding supplemented by use of image data of the second field with registration correction.

With reference to FIG. 2D, it will be seen that in this example the disparity vector has a horizontal direction and a magnitude equal to the width of a bar code element, as indicated at 46 in FIG. 2D. With availability of image data for the first and second fields as stored in memory 30 of FIG. 1, processor 40 can be arranged to determine disparity vector values for one or more field locations using processing techniques based on fuzzy logic or other approaches. For example, the methodology provided in U.S. Pat. No. 5,304, 787, titled "Locating 2D Bar Codes" may be employed. That patent issued to the present inventor describes techniques for locating a bounding box around a bar code in stored image data, for purposes of determining the location and orientation of the bar code in an image area. In accordance with the patent, the coordinates of the corners of a rectangular box encompassing a bar code can be identified. By identifying the coordinates of a corresponding corner of such a bounding box in each of two successive fields of image data, differences between such coordinates represent the magnitude and direction of the relevant disparity vector. As will be appreciated, for image data of a particular set of first and second fields, the same disparity vector values (e.g., magnitude, or magnitude and direction) will typically apply for all pixel locations. However, in particular embodiments it may be desirable to provide a plurality of disparity vector computations for each field set, or even to provide a disparity vector calculation in processing each pixel, depending upon particular processing arrangements.

Figure 3:
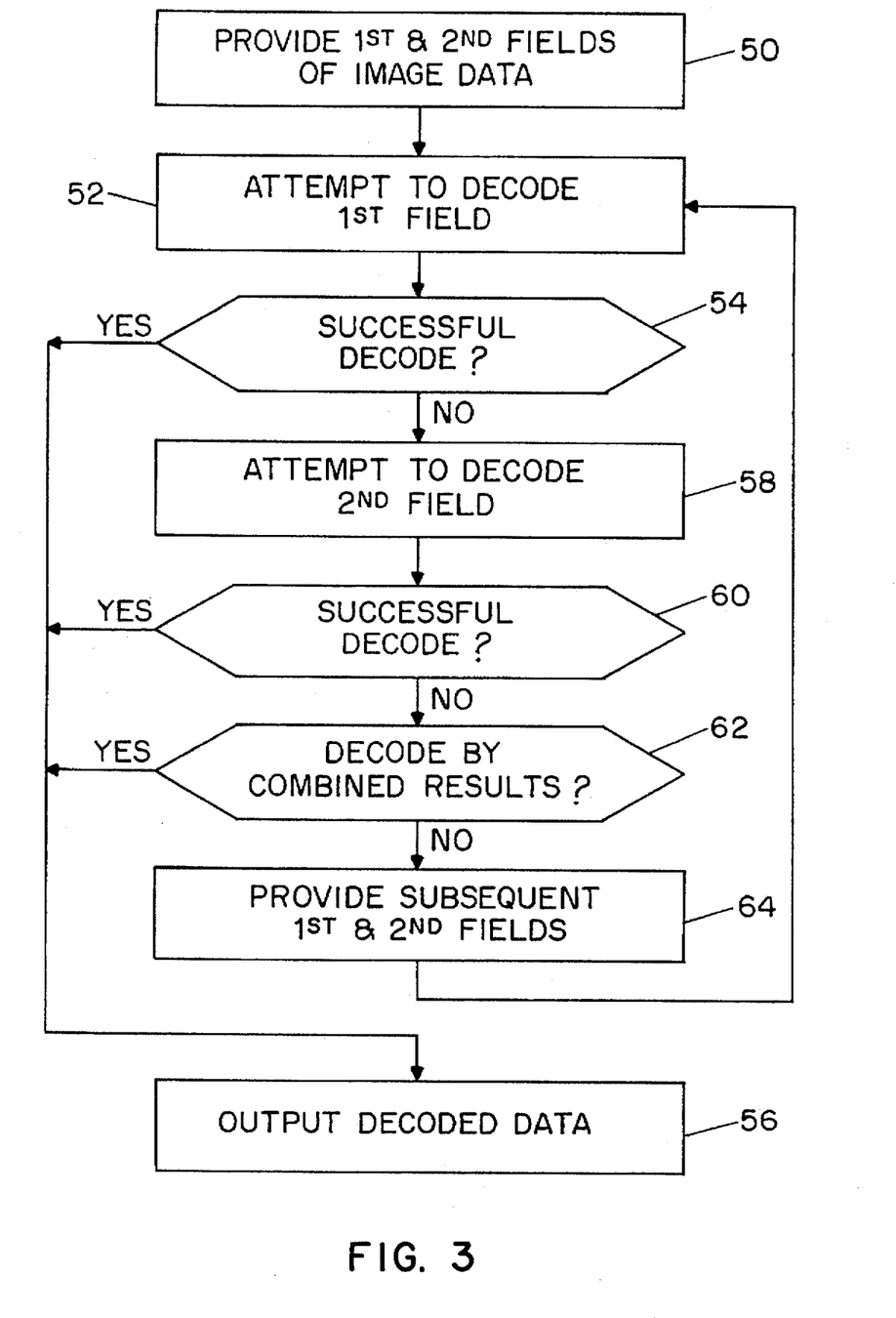
FIGS. 3, 4 and 5 are flow charts useful in respectively describing first, second and third methods of dataform decoding in accordance with the invention, which operate with sequential fields subject to image offset causing registration error.

Referring now to FIG. 3, there is provided a flow chart helpful in describing a first embodiment of method, in accordance with the invention, for decoding a dataform by use of image data for sequential fields subject to image offset causing registration error. At step 50 there are provided first and second fields of image data representative of illumination levels reflected from elements of a dataform and subject to offset. As already described, such image data may be two successive fields of image data of an image frame provided by operating a CCD camera 12 including a two-dimensional array of sensors, digitizing the image signals, and storing the two fields of image data in field stores 32 and 34 of FIG. 1. It will be appreciated that while the sequential fields (usually two successive fields of a given frame) are described as subject to image offset, the actual presence of any such offset will depend on the particular operating conditions from time to time and decoding will proceed whether or not any image offset is present.

At step 52 first field image data is utilized to decode a portion of the dataform. Typically an attempt will be made to decode the entire dataform. Using known techniques, at step 54 processor 10 determines whether the entire dataform has been successfully decoded as necessary to provide a desired level of decoding. Assuming the entire dataform is to be decoded (rather than a particular portion of interest) known types of error correction and similar techniques can be used to enable recovery of data encoded into the dataform, even though initial decoding of the image data is not entirely successful. Successful decoding, therefore, need not require initial decoding of every cell or element of a dataform. At step 54, if there has been a successful decode the FIG. 3 method proceeds to step 56 to output the decoded data for further processing, transmittal to a processing site, or other use. If, at step 54, a desired level of decoding, as predetermined for the particular circumstances of operation, has not been achieved the method proceeds to step 58.

At step 58, second field image data is utilized to decode a portion of the dataform (e.g., the entire dataform). Step 60 is similar to step 54. If there has been a successful decode of the entire dataform at step 58, then at step 60 the method proceeds to step 56. If a desired level of decoding of the entire dataform is not achieved the method proceeds to step 62.

At step 62 the results of steps 52 and 58 are combined. The processor determines whether the results based on the separate decoding of the first and second fields can be combined to provide the desired level of decoding of the dataform (e.g., a level of decoding which is adequate when augmented by error correction, etc.). If the combined results are adequate, then at step 62 the method proceeds to step 56. If a desired level of decoding has not been achieved the method proceeds to step 64. At step 64, since the combined results of steps 52 and 58 were inadequate, the method repeats the foregoing steps to provide subsequent fields of image data for processing.

With understanding of the foregoing, many variations of methods in accordance with the invention can be utilized by skilled persons. For example, at step 58, instead of attempting a complete decode of the dataform, attention can be directed to attempting to decode at step 58 only one or more portions of the dataform which were not successfully decoded at step 52. More particularly, at step 58, each partially decoded portion may be combined with the results of step 52 immediately, to provide decoded data as quickly as possible. This is an "on the fly" embodiment. The method then proceeds basically as described and at step 62 a determination is made as to whether a desired level of decoding has been achieved based on the combined results. If not, the method would proceed to step 64 as described. As will be further described with reference to FIG. 5, the method of FIG. 3 may also be arranged to utilize disparity vector techniques for offset error correction in accordance with the invention.

Figure 4:
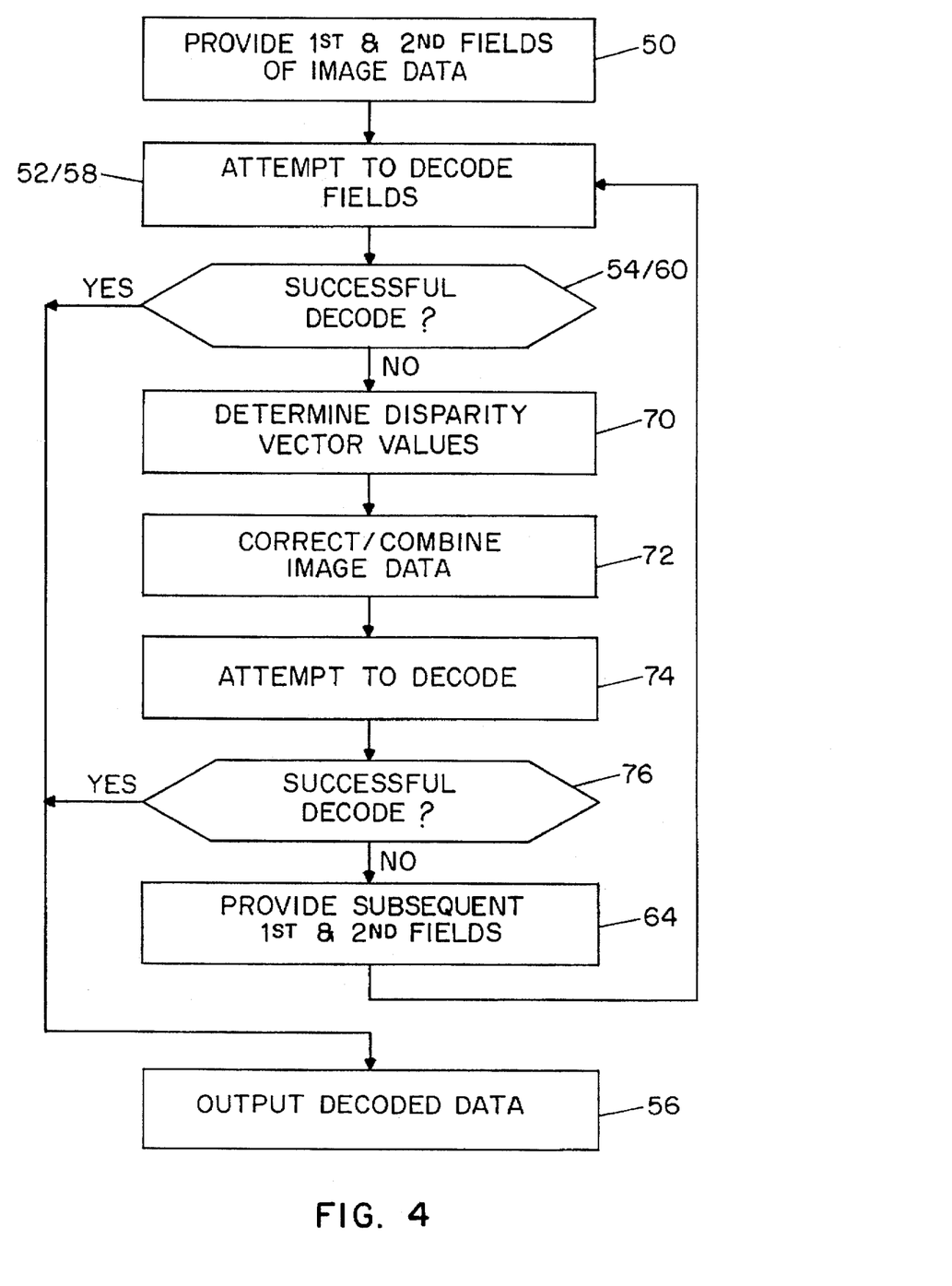

FIG. 4 is a flow chart illustrating a second embodiment of a dataform decoding method. At step 50, as in FIG. 3, first and second fields of image data are provided. Steps 52/58 and 54/60 represent the series of steps 52, 54, 58, 60 of FIG. 3 wherein attempts are made to decode the two fields independently. If successful, the method proceeds to step 56, as in the FIG. 3 method, if not, the FIG. 4 method proceeds to step 70.

At step 70, image data of the first and second fields is used to determine disparity vector values (e.g., magnitude, or magnitude and direction) as described above by use of bounding boxes or other suitable techniques.

At step 72, the disparity vector magnitude is used to enable improved registration of image data of one field relative to image data of the other field. For example, disparity vector values can be used on the fly during image data processing to successively select and correct registration of pixel values for contiguous image elements of the first and second fields. Alternatively, all image data for a portion or all of the second field can be corrected by use of the disparity vector values and stored in memory to provide image data for a complete frame with registration correction.

At step 74, an attempt is made to decode all or a selected portion of the dataform by use of image data of both fields, with use of the disparity vector values to enable operation with improved registration. As will be appreciated by skilled persons, steps 72 and 74 as described may be provided as separate steps or may effectively be aspects of a continuing correction/decoding process, depending on the processing as implemented in particular applications. At step 76 a determination is made as to whether a desired level of decoding has been achieved. If achieved, the method proceeds to step 56, if not, the method proceeds to step 64 to provide subsequent fields of image data and repetition of the preceding steps. With an understanding of the FIG. 4 method, it will be apparent that in particular applications it may be appropriate to omit steps 52/58 and 54/60. With this variation, the FIG. 4 method would proceed directly from step 50 to step 70 for processing and decoding based on use of disparity vector values.

Figure 5:
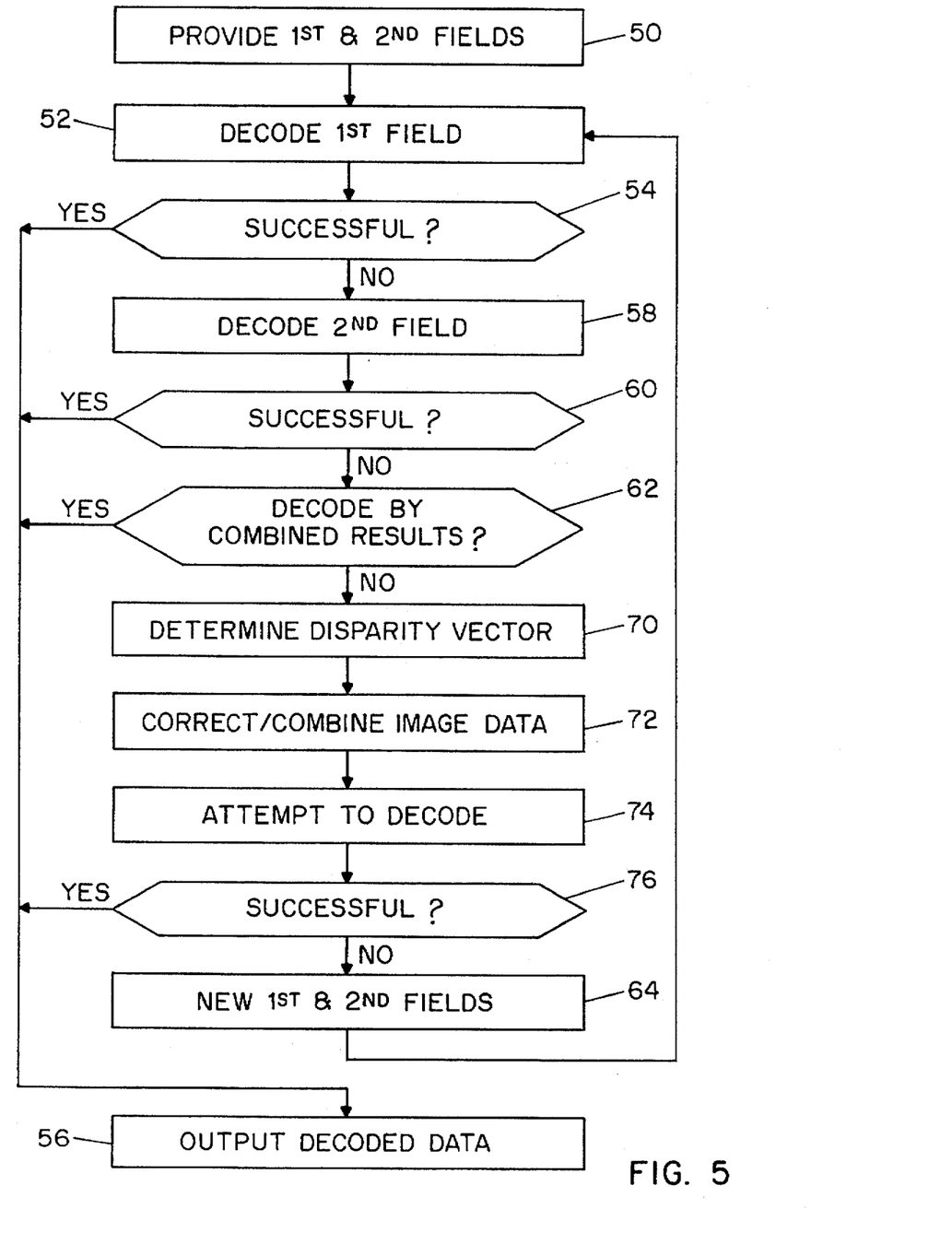

FIG. 5 is a flow chart illustrating a decoding method combining the methods of FIGS. 3 and 4. As shown, if steps 50, 52, 54, 58, 60 and 62 (as described with reference to FIG. 3) do not provide the desired level of decoding, the FIG. 5 method proceeds with steps 70, 72, 74, 76, 56 and 64 (as described with reference to FIG. 4). Choice and composition of steps of methods in accordance with the invention can thus be selected and formulated in view of the type and complexity of dataforms typical in particular applications, as well as the overall accuracy and completeness of decoded results required. Relevant operating conditions concerning operator performance and other physical aspects of operating performance can also be taken into consideration.

While there have been described the currently preferred embodiments of the invention, those skilled in the art will recognize that other and further modifications may be made without departing from the invention and it is intended to claim all modifications and variations as fall within the scope of the invention.

What is claimed is:

1. A dataform reader, configured to reduce effects of image offset causing registration error between sequential fields of image data, comprising:

a sensor array responsive to illumination reflected from a dataform to provide signals representative of illumination levels on first and second groups of sensors respectively representing first and second field images subject to image offset;

a memory coupled to said sensor array to store first field image data representative of said illumination levels on the first group of sensors and to store second field image data representative of said illumination levels on the second group of sensors; and a processor arranged to access said memory to utilize said first field image data to decode a portion of said dataform and to utilize said second field image data to supplement decoding of said dataform.

2. A dataform reader as in claim 1, wherein said processor is arranged to use said second field image data to decode one or more portions of said dataform when said portions are not decodable by use of said first field image data.

3. A dataform reader as in claim 1, wherein said processor is arranged to use said first field image data to attempt to decode all portions of said dataform, to use said second field image data to attempt to decode all portions of the dataform, and to use decoded results from said second field image data to supplement incomplete decoded results from use of said first field image data.

4. A dataform reader as in claim 1, wherein said processor is arranged to use image data of said first and second fields to determine a magnitude value of a disparity vector representative of an image offset between image data of said fields, said disparity vector value usable to correct offset effects during decoding of said dataform.

5. A dataform reader as in claim 4, wherein said processor is arranged to use the magnitude value of said disparity vector to correct image offset effects to enable combined use of image data of said first and second fields for decoding of said dataform.

6. A dataform reader as in claim 1, wherein said dataform reader is configured for hand-held use and field-to-field hand-held jitter causes said image offset.

7. A dataform reader as in claim 1, wherein said memory comprises a first memory capacity coupled to said sensor array to store said first field image data and a second memory capacity coupled to said sensor array to store said second field image data.

8. A dataform reader as in claim 7, wherein said first and second memory capacities are one of: two separate field store memories; first and second sections of a common memory; and selected address location portions of a common memory.

9. A dataform reader as in claim 1, wherein said processor is a microprocessor operating with appropriate software programming.

10. A dataform reader, configured to reduce effects of image offset causing registration error between sequential fields of image data, comprising:

a sensor array responsive to illumination reflected from a dataform to provide signals representative of illumination levels on first and second groups of sensors respectively representing first and second field images subject to image offset;

a memory coupled to said sensor array to store first field image data representative of said illumination levels on the first group of sensors and to store second field image data representative of said illumination levels on the second group of sensors; and a processor responsive to image data of said first and second fields to determine the magnitude of at least one disparity vector extending in a direction representative of said image offset, said processor arranged to utilize said disparity vector magnitude to provide enhanced decoding of said dataform by use of image data of both said first and second fields.

11. A dataform reader as in claim 10, wherein said processor utilizes said disparity vector magnitude to enable image data of said first and second fields to be combined with improved registration prior to decoding of said dataform.

12. A dataform reader as in claim 10, wherein said processor utilizes said disparity vector magnitude to provide registration corrections enabling processing of corresponding portions of image data of said first and second fields in decoding of said dataform.

13. A dataform reader as in claim 10, wherein said dataform reader is configured for hand-held use and field-to-field hand-held jitter causes said image offset.

14. A dataform reader as in claim 10, wherein said memory comprises a first memory capacity coupled to said sensor array to store said first field image data and a second memory capacity coupled to said sensor array to store said second field image data.

15. A dataform reader as in claim 14, wherein said first and second memory capacities are one of: two separate field store memories; first and second sections of a common memory; and selected address location portions of a common memory.

16. A dataform reader as in claim 10, wherein said processor is a microprocessor operating with appropriate software programming.

17. A dataform reader, configured to reduce effects of image offset causing registration error between sequential fields of image data, comprising:

a sensor array responsive to illumination reflected from a dataform to provide signals representative of illumination levels on first and second groups of sensors respectively representing first and second field images subject to image offset;

a memory coupled to said sensor array to store first field image data representative of said illumination levels on the first group of sensors and to store second field image data representative of said illumination levels on the second group of sensors; and a processor responsive to image data of said first and second fields to determine the magnitude of at least one disparity vector extending in a direction representative of said image offset, said processor arranged to utilize said disparity vector magnitude to provide an enhanced image.

18. A dataform reader as in claim 17, wherein said processor utilizes said disparity vector magnitude to enable image data of said first and second fields to be combined with improved registration to provide said enhanced image.

19. A dataform reader as in claim 17, wherein said dataform reader is configured for hand-held use and field-to-field hand-held jitter causes said image offset.

20. A dataform reader as in claim 17, wherein said memory comprises a first memory capacity coupled to said sensor array to store said first field image data and a second memory capacity coupled to said sensor array to store said second field image data.

21. A dataform reader as in claim 20, wherein said first and second memory capacities are one of: two separate field store memories; first and second sections of a common memory; and selected address location portions of a common memory.

22. A dataform reader as in claim 11, wherein said processor is a microprocessor operating with appropriate software programming.

* * * * *